(12) United States Patent
Hart

(10) Patent No.: US 8,872,827 B2
(45) Date of Patent: Oct. 28, 2014

(54) SHADOW SOFTENING GRAPHICS PROCESSING UNIT AND METHOD

(71) Applicant: Nvidia Corporation, Santa Clara, CA (US)

(72) Inventor: G. Evan Hart, Bristow, VA (US)

(73) Assignee: Nvidia, Santa Clara, CA (US)

( * ) Notice: Subject to any disclaimer, the term of this patent is extended or adjusted under 35 U.S.C. 154(b) by 200 days.

(21) Appl. No.: 13/721,262

(22) Filed: Dec. 20, 2012

(65) Prior Publication Data

US 2014/0176546 A1 Jun. 26, 2014

(51) Int. Cl.
*G06T 15/60* (2006.01)

(52) U.S. Cl.
CPC .................................. *G06T 15/60* (2013.01)
USPC ........................... 345/426; 345/422; 345/582

(58) Field of Classification Search
CPC .............................. G06T 15/60; G06T 15/04
USPC ......................................... 345/422, 426, 582
See application file for complete search history.

(56) References Cited

U.S. PATENT DOCUMENTS

| 6,222,552 | B1 * | 4/2001 | Haas et al. ..................... 345/422 |
| 6,664,962 | B1 * | 12/2003 | Komsthoeft et al. .......... 345/426 |
| 7,817,823 | B1 * | 10/2010 | O'Donnell ...................... 382/103 |
| 2005/0195198 | A1 * | 9/2005 | Anderson et al. ............. 345/506 |
| 2008/0036764 | A1 * | 2/2008 | Chung et al. ................... 345/422 |
| 2011/0085736 | A1 * | 4/2011 | Dmitriev et al. .............. 382/199 |

OTHER PUBLICATIONS

Reeves, William T., et al., "Rendering Antialiased Shadows with Depth Maps", Computer Graphics, vol. 21, ACM, No. 4, Jul. 1987.
Bavoil, Louis, "MultiView Soft Shadows", Nvidia, Mar. 2011, 7 pages.
Fernando, Randima, Percentage-Closer Soft Shadows, Nvidia Corporation, SIGGRAPH 2005, 4 pages.

* cited by examiner

*Primary Examiner* — Maurice L McDowell, Jr.

(57) ABSTRACT

A shadow softening GPU and method. One embodiment of the GPU is configured to render a shadow cast by a surface occluding a light source and includes: (1) a fetching circuit operable to retrieve a depth value from a texture associated with the surface and a depth comparison result in a single fetch operation, and (2) a shadow softening circuit configured to respectively employ the depth comparison result and the depth value to identify the surface as a blocker and attenuate the light source for a pixel.

20 Claims, 3 Drawing Sheets

SHADOW SOFTENING GRAPHICS PROCESSING UNIT AND METHOD

TECHNICAL FIELD

This application is directed, in general, to computer graphics rendering and, more specifically, to the rendering of shadows.

BACKGROUND

Many computer graphic images are created by mathematically modeling the interaction of light with a three-dimensional (3D) scene from a given viewpoint. This process, called "rendering," generates a two-dimensional (2D) image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem, architecturally centered about a graphics processing unit (GPU). Typically, the CPU performs high-level operations, such as determining the position, motion, and collision of objects in a given scene. From these high-level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

Scene geometry is typically represented by geometric primitives, such as points, lines, polygons (for example, triangles and quadrilaterals), and curved surfaces, defined by one or more two- or three-dimensional vertices. Each vertex may have additional scalar or vector attributes used to determine qualities such as the color, transparency, lighting, shading, and animation of the vertex and its associated geometric primitives. Scene geometry may also be approximated by a depth texture representing view-space Z coordinates of opaque objects covering each pixel.

Many graphics processing subsystems are highly programmable through an application programming interface (API), enabling complicated lighting and shading algorithms, among other things, to be implemented. To exploit this programmability, applications can include one or more graphics processing subsystem programs, which are executed by the graphics processing subsystem in parallel with a main program executed by the CPU. Although not confined merely to implementing shading and lighting algorithms, these graphics processing subsystem programs are often referred to as "shading programs," "programmable shaders," or simply "shaders."

Shadows are often rendered with respect to a single light source and then merged together with shadows rendered for each other light source. In computer graphics, scenes generally contain complex geometries and numerous light sources. Shadow rendering, or shading, per light source can become a critically long process in the graphics pipeline and is often afforded a great deal of attention to speed the processing.

Also of great importance is how realistic the rendered shadows turn out. Shadows experience a phenomenon known as contact-hardening. Contact-hardening occurs as a shadow-casting surface, or "blocker," nears the surface being shaded, or the "receiver." Shadows nearest the intersection are sharp or "hard," and then soften or blur as the shadow extends away, creating a penumbra effect. Contact-hardening soft shadows are important for realistic rendering because the human visual system uses the variations of penumbra size as a cue for evaluating distances between shadow-casting and shadow-receiving objects.

SUMMARY

One aspect provides a GPU configured to render a shadow cast by a surface occluding a light source, including: (1) a fetching circuit operable to retrieve a depth value from a texture associated with the surface and a depth comparison result in a single fetch operation, and (2) a shadow softening circuit configured to respectively employ the depth comparison result and the depth value to identify the surface as a blocker and attenuate the light source for a pixel.

Another aspect provides a method of shadow softening a pixel in a scene with respect to a light source, including: (1) rendering a light-space depth map for the scene with respect to the light source, (2) comparing a sample depth from the light-space depth map to a screen-space depth of the pixel transformed into light space, (3) fetching the sample depth from a texture held in a memory and a result of the comparing in a single fetch operation, and (4) employing the result and the sample depth in attenuating the light source with respect to the pixel.

Yet another aspect provides a graphics processing subsystem configured to shade a pixel, including: (1) a memory configured to store a shadow map texture containing texels characterizing potentially occluding surfaces with respect to a light source, the texels configured to contain a light-space depth value, and (2) a GPU configured to take sample texels of the shadow map texture about the pixel and having: (2a) a fetching circuit operable to retrieve the light-space depth value from one of the sample texels and a depth comparison result in a single fetch operation, and (2b) a shadow softening circuit configured to respectively employ the depth comparison result and the light-space depth value of each of the sample texels to identify the potentially occluding surfaces as blockers and attenuate the light source for the pixel.

BRIEF DESCRIPTION

Reference is now made to the following descriptions taken in conjunction with the accompanying drawings, in which.

DETAILED DESCRIPTION

Figure 1:
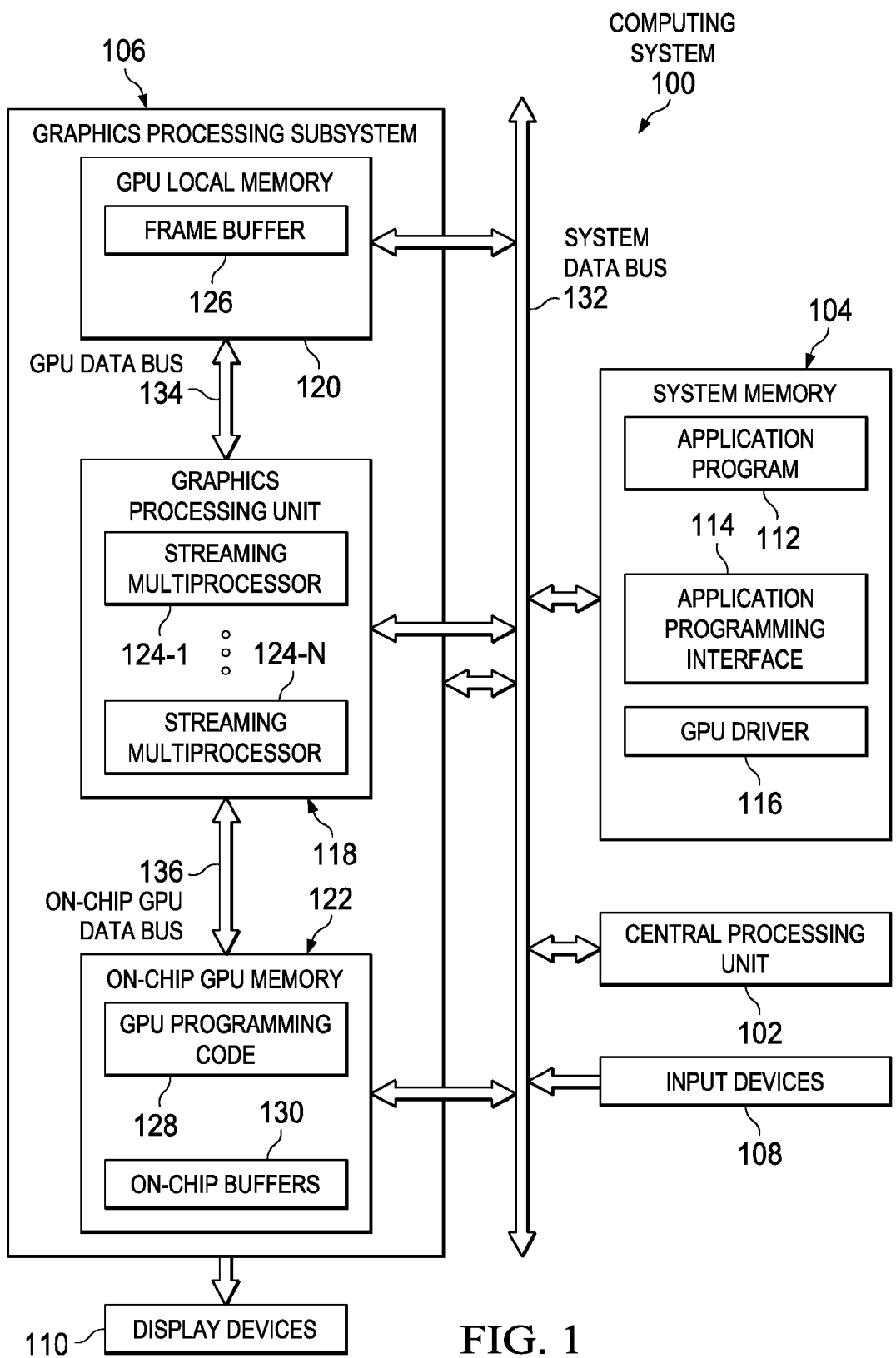
FIG. 1 is a block diagram of a computing system within which the GPU or method introduced herein may be embodied or carried out.

Before describing various embodiments of the shadow softening GPU or method introduced herein, shadow softening will be generally described.

Several shadow softening techniques are frequently implemented in graphics processing systems. One such technique is known as percentage closer filtering (PCF). In PCF, the degree of softening is proportional to the percent of samples between a pixel and a light source. Another technique is percentage closer soft shadows (PCSS), which is an extension of PCF that provides contact-hardening. These and many others can be described in two stages: shadow mapping and shadow rendering.

Shadow mapping is a process by which a scene is rendered with respect to a single light source. This frame of reference is known as light-space. In light-space, the geometry of the scene is rasterized at some resolution into a depth map capturing the surfaces in the scene receiving direct light from the light source. In other words, the depth map represents what surfaces the light source sees. The depth map, sometimes called a shadow map, is stored in a texture data structure. Each point in the rasterization is a texel.

Outside of this shadow mapping process is normal scene geometry rendering, rasterizing the scene into screen-space. Screen-space is the frame of reference for the eye of the viewer. A screen-space scene is similarly stored as a depth map in the depth buffer, or Z-buffer. The screen-space depth map represents the surfaces in the scene the eye can see. Each rasterized pixel in screen-space is the subject of shadow rendering, specifically shadow softening.

Shadow rendering operates pixel-by-pixel by sampling nearby surfaces and determining whether or not those surfaces occlude light that would otherwise be incident on the pixel being rendered. This determination may be made by a light-space depth comparison of the pixel and each of the sampled nearby surfaces. To make the comparison, the screen-space depth of the pixel being rendered is first transformed from screen-space into light-space. The light-space depth map is then sampled about the pixel, now transformed into light-space. The light-space depth of each sample is compared to the light-space depth, or "reference depth," of the pixel being rendered. If the sample depth is between the light source and the reference depth (i.e., $depth_{sample} < depth_{reference}$), the surface characterized by that depth sample is a blocker. The sample depth is then considered by the shadow softening process. If the sample depth is beyond the pixel, the surface characterized by that depth sample contributes no shading to the pixel.

It is realized herein that many implementations of shadow rendering require the use of the depth value and the result of a comparison of the depth value to a reference depth, the depth value being stored in a texel and the comparison being made on retrieval. It is further realized herein that existing architectures provide these two pieces of data independently and, consequently, existing architectures place a processing burden on the GPU to fetch the depth value from a texel stored in memory and to carry out the comparison. It is realized herein that an architecture configured to fetch both the depth value from the texel stored in memory and the result of the comparison value in a single fetch operation allows for more efficient use of graphics processing hardware.

Having described various novel realizations, a computing system within which the shadow softening GPU and method introduced herein may be embodied or carried out will be described.

FIG. 1 is a block diagram of one embodiment of a computing system 100 in which one or more aspects of the invention may be implemented. The computing system 100 includes a system data bus 132, a central processing unit (CPU) 102, input devices 108, a system memory 104, a graphics processing subsystem 106, and display devices 110. In alternate embodiments, the CPU 102, portions of the graphics processing subsystem 106, the system data bus 132, or any combination thereof, may be integrated into a single processing unit. Further, the functionality of the graphics processing subsystem 106 may be included in a chipset or in some other type of special purpose processing unit or co-processor.

As shown, the system data bus 132 connects the CPU 102, the input devices 108, the system memory 104, and the graphics processing subsystem 106. In alternate embodiments, the system memory 100 may connect directly to the CPU 102. The CPU 102 receives user input from the input devices 108, executes programming instructions stored in the system memory 104, operates on data stored in the system memory 104, and configures the graphics processing subsystem 106 to perform specific tasks in the graphics pipeline. The system memory 104 typically includes dynamic random access memory (DRAM) employed to store programming instructions and data for processing by the CPU 102 and the graphics processing subsystem 106. The graphics processing subsystem 106 receives instructions transmitted by the CPU 102 and processes the instructions to render and display graphics images on the display devices 110.

As also shown, the system memory 104 includes an application program 112, an application programming interface (API) 114, and a graphics processing unit (GPU) driver 116. The application program 112 generates calls to the API 114 to produce a desired set of results, typically in the form of a sequence of graphics images. The application program 112 also transmits zero or more high-level shading programs to the API 114 for processing within the GPU driver 116. The high-level shading programs are typically source code text of high-level programming instructions that are designed to operate on one or more shading engines within the graphics processing subsystem 106. The API 114 functionality is typically implemented within the GPU driver 116. The GPU driver 116 is configured to translate the high-level shading programs into machine code shading programs that are typically optimized for a specific type of shading engine (e.g., vertex, geometry, or fragment).

The graphics processing subsystem 106 includes a graphics processing unit (GPU) 118, an on-chip GPU memory 122, an on-chip GPU data bus 136, a GPU local memory 120, and a GPU data bus 134. The GPU 118 is configured to communicate with the on-chip GPU memory 122 via the on-chip GPU data bus 136 and with the GPU local memory 120 via the GPU data bus 134. The GPU 118 may receive instructions transmitted by the CPU 102, process the instructions to render graphics data and images, and store these images in the GPU local memory 120. Subsequently, the GPU 118 may display certain graphics images stored in the GPU local memory 120 on the display devices 110.

The GPU 118 includes one or more streaming multiprocessors 124. Each of the streaming multiprocessors 124 is capable of executing a relatively large number of threads concurrently. Advantageously, each of the streaming multiprocessors 124 can be programmed to execute processing tasks relating to a wide variety of applications, including but not limited to linear and nonlinear data transforms, filtering of video and/or audio data, modeling operations (e.g., applying of physics to determine position, velocity, and other attributes of objects), and so on. Furthermore, each of the streaming multiprocessors 124 may be configured as a shading engine that includes one or more programmable shaders, each executing a machine code shading program (i.e., a thread) to perform image rendering operations. The GPU 118 may be provided with any amount of on-chip GPU memory 122 and GPU local memory 120, including none, and may employ on-chip GPU memory 122, GPU local memory 120, and system memory 104 in any combination for memory operations.

The on-chip GPU memory 122 is configured to include GPU programming code 128 and on-chip buffers 130. The GPU programming 128 may be transmitted from the GPU driver 116 to the on-chip GPU memory 122 via the system data bus 132. The GPU programming 128 may include a machine code vertex shading program, a machine code geometry shading program, a machine code fragment shading program, or any number of variations of each. The on-chip buffers 130 are typically employed to store shading data that requires fast access to reduce the latency of the shading engines in the graphics pipeline. Since the on-chip GPU memory 122 takes up valuable die area, it is relatively expensive.

The GPU local memory 120 typically includes less expensive off-chip dynamic random access memory (DRAM) and is also employed to store data and programming employed by the GPU 118. As shown, the GPU local memory 120 includes a frame buffer 126. The frame buffer 126 stores data for at least one two-dimensional surface that may be employed to drive the display devices 110. Furthermore, the frame buffer 126 may include more than one two-dimensional surface so that the GPU 118 can render to one two-dimensional surface while a second two-dimensional surface is employed to drive the display devices 110.

The display devices 110 are one or more output devices capable of emitting a visual image corresponding to an input data signal. For example, a display device may be built using a cathode ray tube (CRT) monitor, a liquid crystal display, or any other suitable display system. The input data signals to the display devices 110 are typically generated by scanning out the contents of one or more frames of image data that is stored in the frame buffer 126.

Having generally described a computing system within which the shadow softening GPU or method may be embodied or carried out, various embodiments of the shadow softening GPU and method introduced herein will be described.

Figure 2:
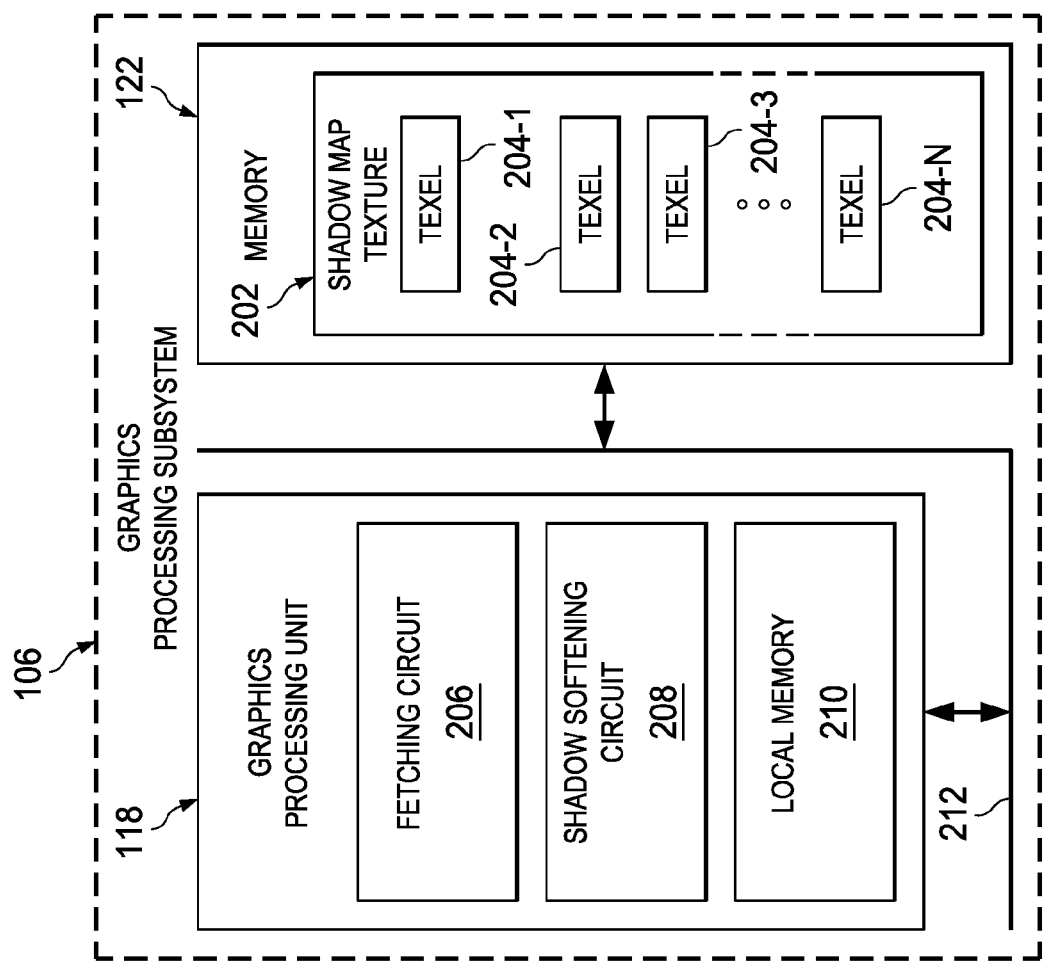
FIG. 2 is a block diagram of one embodiment of a graphics processing subsystem configured to render soft shadows.

FIG. 2 is a block diagram of one embodiment of the graphics processing subsystem 106 of FIG. 1. Graphics processing subsystem 106 contains GPU 118 and memory 122, of FIG. 1, coupled by a data bus 212. Memory 122 is configured to store a shadow map texture 202 containing N texels 204-1 through 204-N. GPU 118 includes a fetching circuit 206, a shadow softening circuit and a local memory 210. Alternate embodiments may omit local memory 210 in favor of further utilizing memory 122. Other embodiments may be configured to store shadow map texture 202 in local memory 210 rather than memory 122. In those embodiments data bus 212 coupling memory 122 is unnecessary.

Continuing the embodiment of FIG. 2, fetching circuit 206 is configured to retrieve or "fetch" texel data from memory 122 over data bus 212. Shadow softening circuit 208 uses the fetched texel data to render a soft shadow.

Figure 3:
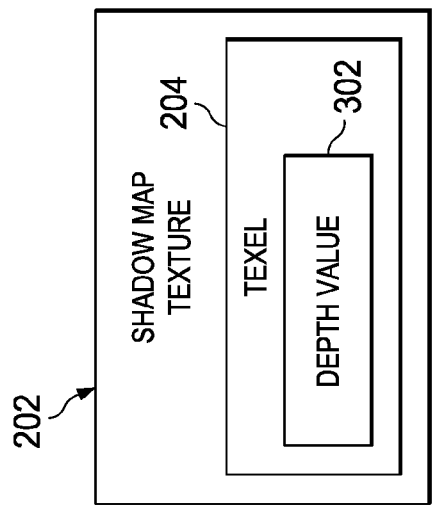
FIG. 3 is a block diagram of one embodiment of a shadow map texel data structure.

FIG. 3 is a block diagram of one embodiment of a shadow texel data structure, or simply texel 204. Texel 204 is contained in shadow map texture of FIG. 2. Texel 204 is a rasterized representation of a surface with respect to a single light source. Texel 204 contains a depth value 302.

Depth value 302 is a light-space depth or Z-buffer value for the surface characterized by texel 204. A pixel being rendered is first rasterized into a screen-space depth buffer. From there it can be transformed or rotated into light-space where it can be compared to depth value 302. The result of this comparison is a depth comparison result. Alternate embodiments may include additional pieces of data in the texel data structure, such as coloring or material properties. Some embodiments may even store the depth comparison result in the texel data structure.

The depth comparison result may be employed as an indicator of whether or not the surface characterized by texel 204 is a potential occluding surface of the light source with respect to the pixel being rendered. The comparison amounts to an evaluation of whether depth value 302 is less than the light-space depth of the pixel being rendered, or the "reference depth." If the depth comparison result is true, the surface characterized by texel 204 is between the pixel and the light source and is then considered by the shadow softening process. The shadow softening process employs depth value 302 to attenuate the light source for the pixel. In certain embodiments, multiple sample texels are considered for rendering the pixel. The depth value 302 and depth comparison result of each sample texel are fetched and employed in the same or similar manner described above. Certain embodiments may employ percentage closer filtering (PCF) to soften shadows. Other embodiments may employ a percentage closer soft shadows (PCSS) technique.

Figure 4:
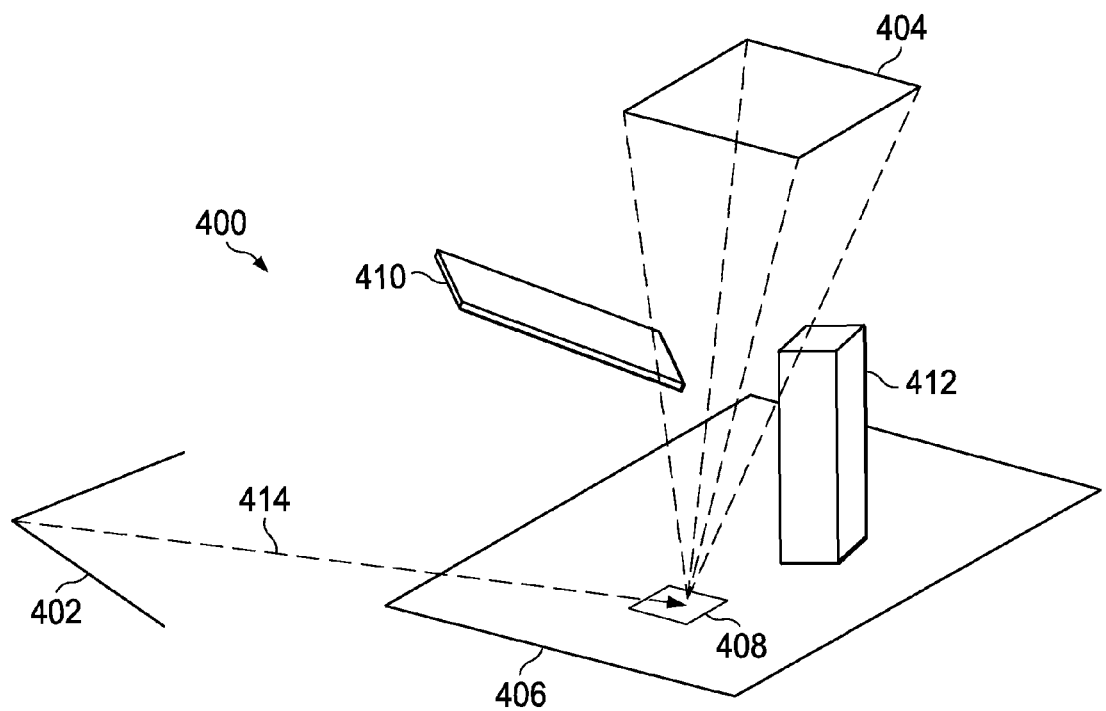
FIG. 4 is an illustration of occluding surfaces with respect to a pixel in light-space.

FIG. 4 is an illustration of a scene 400 having multiple occluding surfaces 410 and 412. A pixel 408 lies on a surface 406 and is visible from a screen-space viewpoint 402. A light source 404 illuminates surface 406 but is occluded to some degree by surfaces 410 and 412. Pixel 408 receives some direct light from light source 404, but also some shading due to surfaces 410 and 412.

To shade pixel 408 with respect to light source 404, a shadow map may be formed with respect to light source 404. A reference frame known as light-space is created at light source 404, and a depth map is rendered in that reference frame. It is apparent in FIG. 4 that surfaces 410 and 412 are between pixel 408 and light source 404. If a screen-space depth 414 of pixel 408 is transformed into light-space, a comparison may be made of the depth of pixel 408 to the depths of surfaces 410 and 412. This comparison would identify both surfaces 410 and 412 as blockers with respect to pixel 408 and light source 404.

Figure 5:
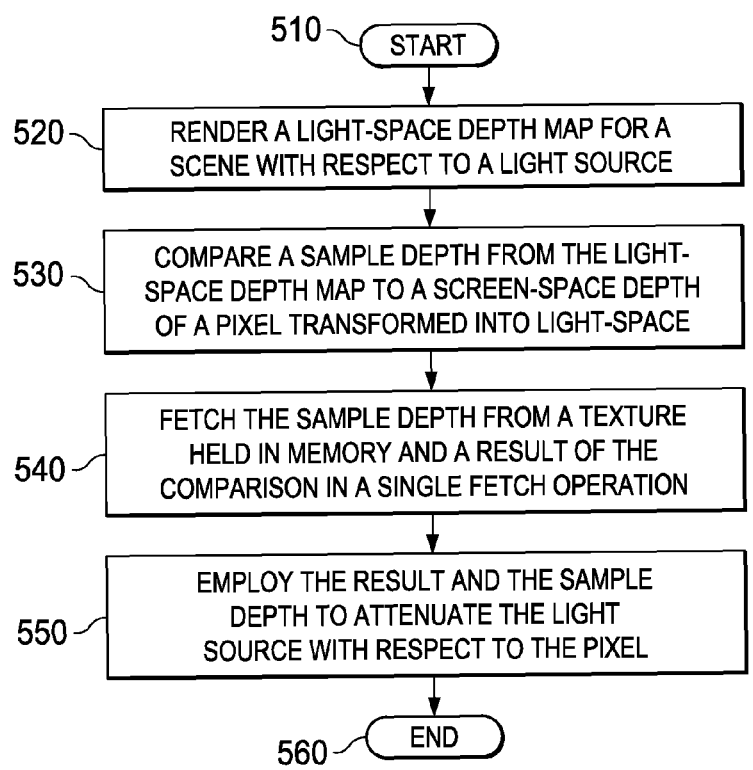
FIG. 5 is a flow diagram of one embodiment of a method of shadow softening.

FIG. 5 is a flow diagram of one embodiment of a method of shadow softening for a pixel. The method begins in a start step 510. A depth map is rendered in light-space at a step 520. The depth map is with respect to a single light source and is otherwise known as a shadow map. In certain embodiments, each light source in a scene has an associated depth map.

Continuing the embodiment of FIG. 5, at a step 530, a sample depth from the depth map is compared to a reference depth. The reference depth is the light-space depth of the pixel being shaded. The reference depth is transformed into light-space from a screen-space depth buffer, or Z-buffer. In a single fetch operation, the comparison result and the sample depth value are fetched from the texel data structure at step 540. Once fetched, the comparison result is a binary indicator as to whether the surface characterized by the texel is potentially occluding the light source with respect to the pixel. In other words, the comparison tests whether the surface is between the light source and the pixel in light-space. If so, at step 550, the light source is attenuated to some degree for that pixel. If not, no attenuation of the light source is attributed to that surface. The method ends in an end step 560.

In certain embodiments the attenuation is achieved by a PCF method. Multiple samples are taken about the pixel and multiple texels fetched. The depth values and depth comparison results of each sample texel are fetched for the PCF processing. Alternate embodiments may employ a PCSS method, also requiring multiple samples.

Those skilled in the art to which this application relates will appreciate that other and further additions, deletions, substitutions and modifications may be made to the described embodiments.

What is claimed is:

1. A graphics processing unit (GPU) configured to render a shadow cast by a surface occluding a light source, comprising:
   a fetching circuit operable to retrieve a depth value from a texture associated with said surface and a depth comparison result in a single fetch operation; and
   a shadow softening circuit configured to respectively employ said depth comparison result and said depth value to identify said surface as a blocker and attenuate said light source for a pixel.

2. The GPU recited in claim 1 wherein said texture is configured to store said depth value and said depth comparison result.

3. The GPU recited in claim 1 wherein said depth comparison result indicates whether said surface is between said light source and a reference depth.

4. The GPU recited in claim 3 wherein said reference depth is a Z-axis depth of said pixel transformed into a reference frame for said light source.

5. The GPU recited in claim 1 wherein said shadow softening circuit is configured to further employ percentage closer filtering to attenuate said light source.

6. The GPU recited in claim 1 wherein said shadow softening circuit is configured to further employ percentage closer soft shadowing to attenuate said light source.

7. The GPU recited in claim 1 wherein said fetching circuit is operable to retrieve four pairs of depth comparison results and depth values in said single fetch operation.

8. A method of shadow softening a pixel in a scene with respect to a light source, comprising:
   rendering a light-space depth map for said scene with respect to said light source;
   comparing a sample depth from said light-space depth map to a screen-space depth of said pixel transformed into light space;
   fetching said sample depth from a texture held in a memory and a result of said comparing in a single fetch operation; and
   employing said result and said sample depth in attenuating said light source with respect to said pixel.

9. The method recited in claim 8 wherein said result of said comparing is stored in said texture held in said memory.

10. The method recited in claim 8 wherein said comparing determines whether a surface represented by said sample depth occludes said light source with respect to said pixel.

11. The method recited in claim 10 wherein said attenuating is carried out if said surface occludes said light.

12. The method recited in claim 8 wherein said comparing is repeated for a plurality of sample depths drawn about said pixel in light-space.

13. The method recited in claim 8 wherein said employing comprises carrying out percentage closer filtering in attenuating said light source.

14. The method recited in claim 8 wherein said employing comprises carryout percentage closer soft shadowing in attenuating said light source.

15. A graphics processing subsystem configured to shade a pixel, comprising:
   a memory configured to store a shadow map texture containing texels characterizing potentially occluding surfaces with respect to a light source, said texels configured to contain a light-space depth value; and
   a graphics processing unit (GPU) configured to take sample texels of said shadow map texture about said pixel and having:
      a fetching circuit operable to retrieve said light-space depth value from one of said sample texels and a depth comparison result in a single fetch operation, and
      a shadow softening circuit configured to respectively employ said depth comparison result and said light-space depth value of each of said sample texels to identify said potentially occluding surfaces as blockers and attenuate said light source for said pixel.

16. The graphics processing subsystem recited in claim 15 wherein said depth comparison result indicates whether a potentially occluding surface is between said light source and a reference depth that is a Z-axis depth of said pixel transformed into a reference frame for said light source.

17. The graphics processing subsystem recited in claim 15 wherein said texels are further configured to store said depth comparison result.

18. The graphics processing subsystem recited in claim 15 wherein said shadow softening circuit is configured to further employ percentage closer filtering to attenuate said light source.

19. The graphics processing subsystem recited in claim 15 wherein said shadow softening circuit is configured to further employ percentage closer soft shadowing to attenuate said light source.

20. The graphics processing subsystem recited in claim 15 wherein said fetching circuit is operable to retrieve four pairs of depth comparison results and light-space depth values in said single fetch operation.

* * * * *